United States Patent [19]
Steindorf

[11] Patent Number: 5,147,660
[45] Date of Patent: Sep. 15, 1992

[54] DEVICE FOR FILLING MOLDS WITH A CASTING RESIN AND THE LIKE

[75] Inventor: Hans-Joachim Steindorf, Sinn, Fed. Rep. of Germany

[73] Assignee: Wilhelm Hedrich Vakuumanlagen GmbH & Co. KG, Ehringshausen-Katzenfurt, Fed. Rep. of Germany

[21] Appl. No.: 689,344

[22] Filed: Apr. 22, 1991

[30] Foreign Application Priority Data

Oct. 5, 1990 [DE] Fed. Rep. of Germany ... 9013922[U]
Oct. 13, 1990 [DE] Fed. Rep. of Germany ... 9014257[U]

[51] Int. Cl.$^5$ .................. B29C 31/04; B29C 45/18
[52] U.S. Cl. .................. 425/148; 425/200; 425/203; 425/542; 425/546; 425/584; 425/405.1; 425/435; 425/447
[58] Field of Search ........... 425/560, 557, 558, 569, 425/580, 586, 590, 591, 143, 148, 200, 203, 405.1, 435, 447, 546, 584; 141/249; 222/45, 105, 386.5, 395

[56] References Cited

U.S. PATENT DOCUMENTS

| 3,351,235 | 11/1967 | Paton | 222/95 |
| 3,421,663 | 1/1969 | Paton | 222/386.5 |
| 4,307,760 | 12/1981 | Hauser | 264/40.1 |
| 4,583,663 | 4/1986 | Bonerb | 222/386.5 |
| 4,728,004 | 3/1988 | Banerb | 222/386.5 |

FOREIGN PATENT DOCUMENTS 2748982  5/1979  Fed. Rep. of Germany.

Primary Examiner—Willard Hoag
Attorney, Agent, or Firm—Flynn, Thiel, Boutell & Tanis

[57] ABSTRACT

A device for filling molds with a casting resin or the like. An elastic casting container, with at least one fill and discharge opening, is arranged in the pressure box, which casting container selectively receives the casting resin therein from a feed pipe and delivers the casting resin to the mold through a fill pipe. The casting container is emptied by a pressure buildup inside of the pressure box, either by means of a gaseous or a liquid pressure medium. In this manner, the casting container can be loaded with the casting resin such that a renewed gas loading of the already degassed casting resin prior to the filling of the mold no longer occurs, while simultaneously limiting cleaning operations.

9 Claims, 2 Drawing Sheets

DEVICE FOR FILLING MOLDS WITH A CASTING RESIN AND THE LIKE

FIELD OF THE INVENTION

The invention relates to a device for filling molds with casting resin or the like, which device includes a pressure box adapted to receive the prepared casting resin therein, from which pressure box the molds are filled and emptied under pressure.

BACKGROUND OF THE INVENTION

Basic elements of such a device are already known from DE-OS 27 48 982. It is moreover also known to design such a device so that the prepared casting resin mixture, which has continuously been degassed in a storage container by agitation and connection to a vacuum pump, is filled into a pressure box, with the filling in process being accomplished with a connected vacuum pump. The pressure box itself or a suitable casting container can be used for pouring into the mold. The feed pipe is thereby initially closed and the pressure box is connected to a pressurized air source or the like so that the casting resin mixture can be pressed out of the pressure box into the mold.

It is not desired that the casting resin mixture, which has already been degassed under vacuum, be brought into contact with the pressurized air or the like, because a certain amount of gas will be absorbed into the casting resin mixture. It is furthermore disadvantageous that a certain amount of the casting resin solidifies in the pressure box or in a part thereof and remains on the walls so that after several operating cycles the coated parts must be cleaned.

It is therefore the purpose of the invention to provide a device of the type identified in greater detail above in such a manner that gas does not again get into the already degassed casting resin prior to it being filled into the molds. Cleaning operations of the pressure box due to solidified casting resins are thereby reduced to a minimum.

SUMMARY OF THE INVENTION

The purpose is attained according to the invention by arranging an elastic casting container with at least one feed and discharge opening in the pressure box, which opening can be connected as desired to a vacuum source, a storage container or feed pipe or to the molds, and by furthermore being able to connect the portion of the inside of the pressure box oriented outside of the elastic casting container alternatively to a vacuum source or a pressure source. It is thereby advantageous when the storage container is simultaneously connected with the pressure box and the vacuum pump. Moreover, it is also advantageous when the storage container, the pressure box and the casting container are simultaneously connected to the vacuum pump and can be separated individually or in any desired combination from the vacuum pump. It is advantageous when the pressure box is rotatable about a horizontal axis. It is also advantageous for a quick cleaning of the pressure box, if an elastic hose piece is used as the casting container, which hose piece has at one or both ends a feed and discharge opening. Liquidy or gaseous materials are used as a pressure medium. When using liquidy pressure media, it is easily possible to handle a tempering and volume determination of the pressed-out casting resin. However, it is also conceivable to provide the device with a separate heating and cooling device. It would thus be possible, for example during an interruption in operation, to cool off the casting resin in the casting container to temperatures which significantly increase the duration of use. Another simple possibility to determine the amount of casting resin in the casting container is to place the device as a whole on a scales or to determine only the amount of casting resin by weighing parts of the device. As a pressure source, it is also possible to use a compressed air source.

The invention attains the purpose in a surprising manner. As will be shown in greater detail in connection with the exemplary embodiments, only very few fittings are needed for such a device, and also the degree of complexity is relatively simple. From the storage container to the mold, the casting resin is constantly degassed and does not again come into contact with the atmosphere or a pressure medium. Thus, casting errors resulting from poorly degassed casting resin are avoided. Using a separate casting container in the pressure box offers the advantage that the casting container can be designed inexpensively and can be quickly exchanged. If simple elastic hose pieces are used for this purpose, then the elastic part of the casting container (for example the hose piece), when it is coated too much with solidified casting resin, is simply thrown away and replaced with a new one.

BRIEF DESCRIPTION OF THE DRAWINGS

Further details of the invention will be discussed hereinafter in connection with the exemplary embodiments and the drawings, in which.

DETAILED DESCRIPTION

Figure 1:
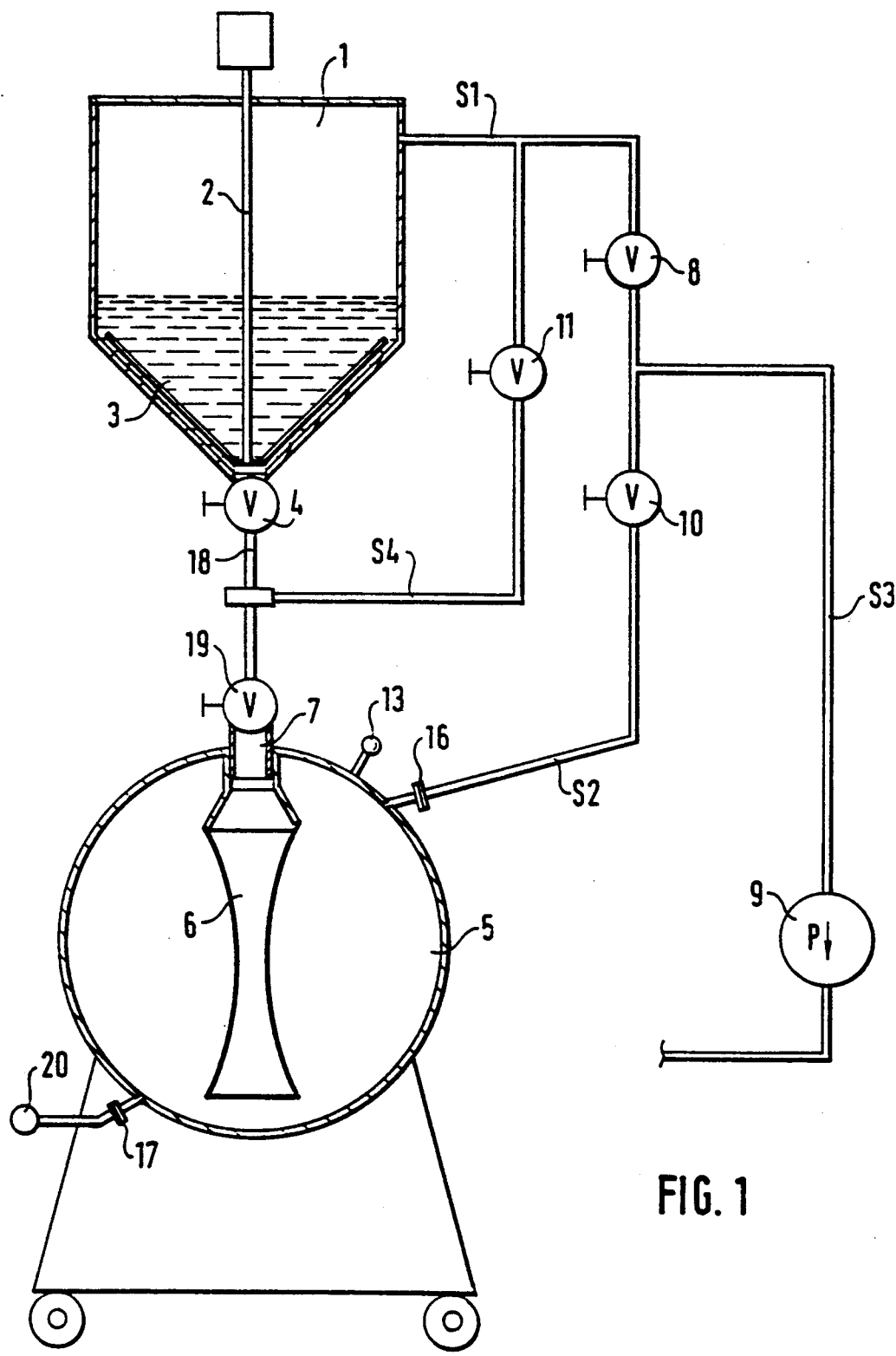
FIG. 1 is a schematic illustration of a device of the invention up to the filling of the casting container.
Figure 2:
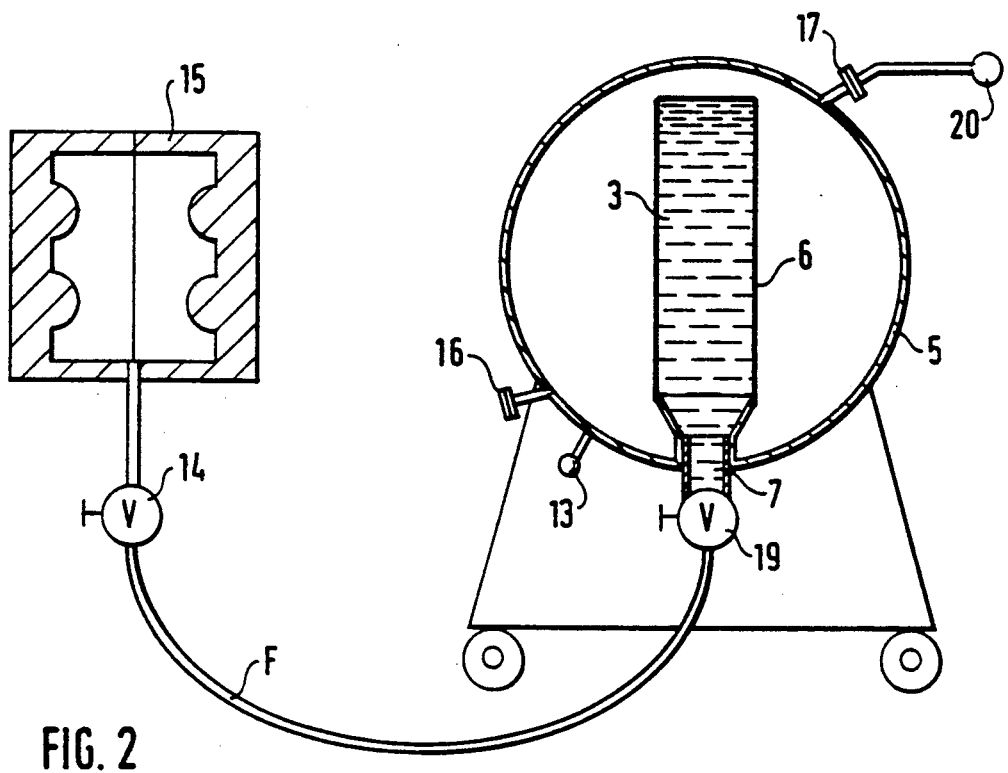
FIG. 2 shows the uncoupled pressure box during filling of a mold.
Figure 3:
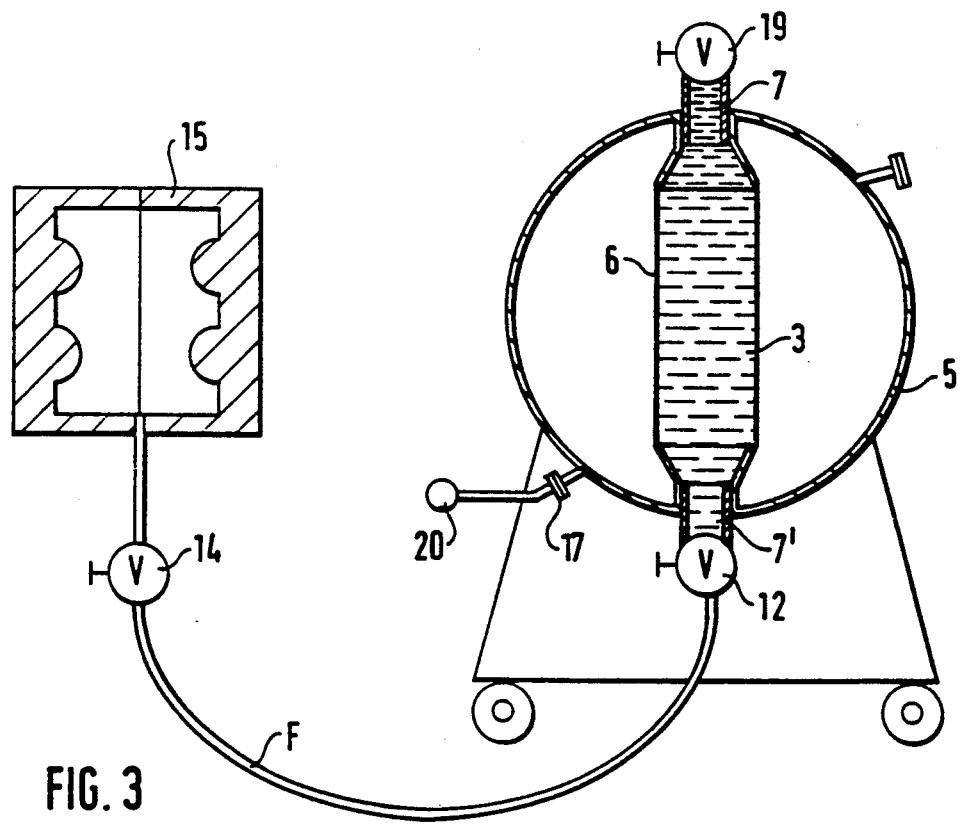
FIG. 3 illustrates a further exemplary embodiment according to the invention.

The device according to the invention shown in FIGS. 1 to 3 consists of a pressure box 5, which is designed advantageously drivably. A casting container 6 of an elastic material is arranged in the pressure box 5. The casting container 6 consists of a hose according to FIGS. 1 and 2, which hose is closed off at its one end. The other end of the hose is connected to the feed and discharge opening 7 of the pressure box 5, which can be closed off by a valve 19. Two connections 16 and 17 exist in the pressure box 5 with a suction pipe S2 being connected to the connection 16, while a pressure pipe for introducing a pressure medium into the pressure box 5 can be connected to the connection 17. The inside of the casting container 6 is separated from the pressure medium introduced into the pressure box 5 by a flexible wall. The pressure box 5 can be evacuated upon the introduction of casting resin 3, thus enabling the filling of casting resin 3 into the casting container 6. The pressure box 5 can be rotated manually into the position shown in FIG. 2. A handle 13 is used to do this.

The flexible hose of the casting container 6 is in a device, as it is illustrated in FIG. 3, connected at each of its two ends respectively to a feed opening 7 and a discharge opening 7' of the pressure box 5. To empty the casting container 6 filled with casting resin, a pressure medium is introduced through the connection 17 into the inside of the pressure box 5 causing the flexible hose of the casting container 6 to be compressed and the casting resin to move through the discharge opening 7' and valve 12, the fill pipe F into the mold 15. After filling the mold 15, the casting container 6 remains connected to the mold 15 through the discharge opening 7', the valve 12, the fill pipe F and the valve 14 and the gas remains under pressure until the curing process in the mold has been concluded.

The pressure medium can be either pressurized air or, however, a liquid, advantageously water, through which the casting resin can be maintained at a casting temperature within the casting container 6. Moreover, using a liquidy pressure medium has the advantage that the amount of the pressure medium pressed into the pressure box 5 can be very precisely determined by suitable measuring instruments so that the exact amount of the pressed-out resin can be determined in this manner.

Another manner of determining the weight of the pressed-out amount of casting resin is to determine the respective weight of the casting resin in the casting container 6.

The exemplary embodiment of FIG. 1 shows the connection 16 on the pressure box 5 in connection with a storage container 1 and a vacuum source 9 in the form of a vacuum pump.

FIG. 1 shows a storage container 1, in which a mixing device 2 is indicated. A batch or continuous mixer can also serve as the casting resin source. The casting resin 3 housed in the storage container 1 can be discharged through a pipe 18. The storage container 1 is connected through a pipe 18, which can be closed off by the valve 4 and a valve 19, to the discharge and feed opening 7 of the casting container 6. A suction pipe S4 is connected to the pipe 18, which suction pipe is connected to the suction pipe S3 and thus to the vacuum pump 9 through valves 11 and 8.

The suction pipe S1 is connected through a valve 8 and the suction pipe S2 through a valve 10 to the suction pipe S3. This guarantees that each one of the suction pipes S1, S2 and S4 can be connected and disconnected as desired.

The pressure box 5 illustrated in FIG. 2 can be rotated 180° so that the casting container 6 can be emptied through the fill and discharge connection 7, which is made easier by the influence of gravity.

A pressure box 5 according to the invention can advantageously also be utilized in a device according to DE-C3-2 748 982. The advantage of this device is that the casting container must no longer be cleaned. Should casting resin solidify in the casting resin container or should it build up on the wall thereof, this inexpensive casting container can easily be replaced with a new one.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A device for filling molds with a casting resin, comprising:
    a hollow and closed pressure box having connection means on an exterior thereof for selectively pressurizing an interior thereof with positive and negative pressures;
    a tubular casting container having an elastically expandable and contractible wall oriented in said interior of said pressure box, said casting container having means defining a fill and discharge opening thereon for facilitating a filling and emptying of said casting container and rendering said fill and discharge opening accessible at the exterior of said pressure box while simultaneously maintaining the closed and pressurizable characteristic of said pressure box;
    emptying means for selectively connecting said fill and discharge opening on said casting container to an inlet to the mold;
    fill means for selectively connecting said fill and discharge opening on said casting container to a storage container for the casting resin; and
    a vacuum source and connection means for selectively connecting said vacuum source to (1) an interior of said storage container for degassing the casting resin and (2) said interior of said pressure box when said fill and discharge opening is connected to said fill means so that as the casting resin enters said casting container, the wall thereof will expand, a releasing of the vacuum in said interior of said pressure box being required in order to facilitate an emptying of said casting container when said casting container is connected to said emptying means.

2. The device according to claim 1, wherein said casting container consists of a flexible hose, said fill and discharge opening being oriented at one end thereof.

3. The device according to claim 2, wherein said hose has a further fill and discharge opening at an opposite end thereof.

4. The device according to claim 1, wherein a pressure medium is employed in said pressure box, and wherein said pressure medium is a fluid.

5. The device according to claim 1, including means for measuring pressure within said pressure box.

6. The device according to claim 1, wherein a means for monitoring the amount of the casting resin existing in the casting container is provided.

7. The device according to claim 1, wherein said storage container is a mixer, the casting resin being mixed in said mixer under a vacuum and is readied therein for filling, wherein said vacuum source is connected to at least one of alternately and simultaneously said storage container and said pressure box, and wherein a pressure source is connected alternatively with respect to said vacuum source to said pressure box to thereby facilitate a conveyance of said casting resin into the molds.

8. The device according to claim 1, wherein said storage container, said pressure box and said casting container are connected simultaneously to said vacuum source, and wherein means is provided for individually separating them in any desired combination from said vacuum pump.

9. A device for filling molds with a casting resin or the like, comprising:
    a hollow pressure box and means supporting said pressure box for rotation;
    an elastic casting container for receiving the prepared casting resin, from which the molds are filled and cured under pressure, said casting container having at least one fill and discharge opening arranged in the pressure box, which opening is selectively connected to at least one of a vacuum source, a storage container, a feed pipe and the molds; and
    means for connecting an inside of the pressure box oriented outside of the elastic casting container alternatively to a vacuum source and a pressure source.

* * * * *